United States Patent
Blew et al.

(10) Patent No.: US 7,519,810 B2
(45) Date of Patent: Apr. 14, 2009

(54) METHODS FOR CONDUCTING SERVER-SIDE ENCRYPTION/DECRYPTION-ON-DEMAND

(75) Inventors: Edwin O. Blew, Doylestown, PA (US); Ker-Ming Chang, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 11/617,916

(22) Filed: Dec. 29, 2006

(65) Prior Publication Data

US 2007/0198823 A1   Aug. 23, 2007

Related U.S. Application Data

(63) Continuation of application No. 10/626,103, filed on Jul. 23, 2003, now abandoned, which is a continuation-in-part of application No. 09/343,921, filed on Jun. 30, 1999, now abandoned.

(51) Int. Cl.
*H04L 9/00* (2006.01)

(52) U.S. Cl. ..................... 713/150; 713/165

(58) Field of Classification Search ............ 713/150, 713/160
See application file for complete search history.

(56) References Cited

U.S. PATENT DOCUMENTS

| | | | |
|---|---|---|---|
| 4,323,921 A | 4/1982 | Guillou | |
| 5,191,611 A | 3/1993 | Lang | |
| 5,548,646 A | 8/1996 | Aziz et al. | |
| 5,623,637 A | 4/1997 | Jones et al. | |
| 5,699,428 A | 12/1997 | McDonnal et al. | |
| 6,006,333 A | 12/1999 | Nielsen | |
| 6,023,506 A * | 2/2000 | Ote et al. | ............ 713/165 |
| 6,052,780 A | 4/2000 | Glover | |
| 6,061,790 A | 5/2000 | Bodnar | |
| 6,105,012 A | 8/2000 | Chang et al. | |
| 6,115,040 A | 9/2000 | Bladlow et al. | |
| 6,134,591 A | 10/2000 | Nickles | |
| 6,169,976 B1 | 1/2001 | Colosso | |
| 6,202,159 B1 | 3/2001 | Ghafir | |
| 6,338,050 B1 | 1/2002 | Conklin | |
| 6,381,644 B2 | 4/2002 | Munguia | |
| 6,421,768 B1 | 7/2002 | Purpura | |
| 7,069,591 B1 * | 6/2006 | Weicher | ............ 726/26 |
| 2002/0023213 A1 | 2/2002 | Walker et al. | |
| 2002/0141588 A1 * | 10/2002 | Rollins | ............ 380/277 |

* cited by examiner

*Primary Examiner*—Kambiz Zand
*Assistant Examiner*—Aubrey H Wyszynski
(74) *Attorney, Agent, or Firm*—Mayer Brown LLP

(57) ABSTRACT

A method and system for encryption and decryption of data files on a web-based computer system includes encrypting the data file in a memory subsystem, such as RAM, storing the encrypted data file in one or more of a plurality of memory locations, analyzing and modifying the encrypted data file, retrieving and decrypting the modified data file, and displaying the decrypted data file on a web browser. The computer system may include one to three servers. The data file may be encrypted and decrypted using any dual-key encryption algorithm, such as PGP, or a single key algorithm. Data transmitted into and out of the computer system may be via an SSL/HTTPS protocol to provide additional security.

7 Claims, 5 Drawing Sheets

METHODS FOR CONDUCTING SERVER-SIDE ENCRYPTION/DECRYPTION-ON-DEMAND

CLAIM OF PRIORITY

This application is a continuation of, claims priority to, and incorporates by reference in its entirety, co-pending U.S. patent application Ser. No. 10/626,103 filed on Jul. 23, 2003, which is a continuation-in-part of, claims priority to, and incorporates by reference in its entirety, co-pending U.S. patent application Ser. No. 09/343,921, filed on Jun. 30, 1999.

FIELD OF THE INVENTION

The present invention is directed to methods and systems for securing files that are received, processed, stored, and delivered on or by typical web server applications, services, and devices.

BACKGROUND OF THE INVENTION

Many current web-based services receive and deliver encrypted files to and from external users or customers over electronic networks, such as the Internet. These web-based services often require their users to encrypt files prior to transmission and decrypt files upon receipt.

Requiring users of a service to encrypt and decrypt files typically requires time-consuming public key exchange procedures between the user and the service provider. In addition, it places a heavy burden on non-technical users who may not be familiar with dual-key encryption methods and tools. Furthermore, the encryption and decryption processes require the service provider to develop and establish a key management infrastructure that increases in complexity as the number of users using the service increases.

What is needed is a method and system for encrypting and decrypting electronic files that overcomes all of these concerns and problems while ensuring that strong protection and security are provided to important files.

SUMMARY OF THE INVENTION

The present invention implements a method used to secure computer files on a computer using encryption. The method may be embedded within one or more computer-readable programs written in a programming language, such as Perl, and running on a computer. The method may employ the use of a single encryption/decryption key pair that is stored on the same computer to encrypt files received from users on an inbound path and to decrypt files delivered to users on an outbound path. All encryption and decryption occurs in real time in a memory subsystem of the computer. As a result, no unencrypted version of an electronic file needs to be created within the computer using the present invention. The method and system do not require the use of any specific encryption product, operating system, or environment.

In a preferred embodiment of the present invention, a method of transferring an electronic file on a computer system includes receiving, by a computer system, an electronic data file, where the computer system includes a memory subsystem and a plurality of memory locations, encrypting the data file in the memory subsystems, and storing the encrypted data file in one or more memory locations. Encrypting the data file occurs without assistance from a user and without requiring knowledge of the encryption algorithm by the user. In an embodiment, the receiving step is performed using a SSL/HTTPS protocol. In an embodiment, the method may further include receiving a username and a password from a user device and verifying that the username and password correspond to a pre-defined user having access to the computer system and/or the encrypted file. In an alternate embodiment, the method further includes retrieving the encrypted data file from the one or more memory locations, decrypting the file, modifying the decrypted data file, encrypting the modified data file, and storing the modified data file in the one or more memory locations.

A method of transferring an electronic file on a computer system includes retrieving, from a computer system including a memory subsystem and a plurality of memory locations, an encrypted data file from one or more memory locations, decrypting the encrypted data file in the memory subsystem, and displaying the decrypted data file. Decrypting the encrypted data file occurs without assistance from a user and without requiring knowledge of the decryption algorithm by the user. In an embodiment, the transmitting step is performed using a SSL/HTTPS protocol. In an embodiment, the method may further include receiving a user name and a password from a user device and verifying that the user name and password correspond to a pre-defined user having access to the computer system and/or the encrypted file. In an alternate embodiment, the method further includes retrieving the encrypted data file from the one or more memory locations, decrypting the file, modifying the decrypted data file, encrypting the modified data file and storing the modified data file in the one or more memory locations.

In an alternate embodiment, a method of transferring an electronic data file on a computer system includes receiving, by a first computer, an electronic data file, where the first computer includes a memory subsystem, encrypting the data file in the memory subsystem, transmitting the encrypted data file to a second computer having a plurality of memory locations, and storing the encrypted data file in one or more memory locations. Encrypting the data file occurs without assistance from a user and without requiring knowledge of the encryption algorithm by the user. In an embodiment, the method further includes, retrieving the encrypted data file from the one or more memory locations, decrypting the data files, modifying the decrypted data file, encrypting the modified data file, and storing the modified data file in the one or more memory locations. In an alternate embodiment, the method further includes retrieving the encrypted data file from the one or more memory locations, transmitting the encrypted data file to a third computer, decrypting the data file, modifying the data file, encrypting the modified data file, transmitting the encrypted modified data file to the second computer, and storing the encrypted modified data file in the one or more memory locations.

In an embodiment, a method of transferring an electronic data file on a computer system includes retrieving, from a first computer having a plurality of memory locations, an encrypted data file from one or more memory locations, transmitting the encrypted data file to a second computer having a memory subsystem, decrypting the encrypted data file in the memory subsystem, and providing access to the decrypted data file. Decrypting the data file occurs without assistance from a user and without requiring knowledge of the decryption algorithm by the user. In an alternate embodiment, the method further includes retrieving the encrypted data file from the one or more memory locations on the first computer, transmitting the encrypted data file to a third computer, decrypting the data file, providing access to or modifying the decrypted data file, encrypting the modified data file, transmitting the encrypted modified data file to the first computer, and storing the modified data file in the one or more memory locations.

In a preferred embodiment, a system for transferring an electronic data file includes a first computer configured to encrypt a data file and decrypt an encrypted data file, the first computer having a memory subsystem, and a second computer, electrically connected to the first computer, and configured to store the encrypted data file, the second computer having a plurality of memory locations. The first computer comprises a processor configured to receive the data file from a user device, encrypt the data file in the memory subsystem, and transmit the encrypted data file to the second computer. The second computer comprises a processor configured to receive the encrypted data file from the first computer and store the encrypted data file in one or more memory locations. Encrypting the data file occurs without assistance from a user and without requiring knowledge of the encryption algorithm by the user. In an embodiment, the system further includes a third computer, electrically connected to the first computer, and configured to modify the encrypted data file. In the embodiment, the processor of the second computer is further configured to retrieve the encrypted data file from the one or more memory locations, transmit the encrypted data file to the third computer, receive an encrypted modified data file from the third computer, and store the modified data file in the one or more memory locations. In the embodiment, the third computer comprises a processor configured to receive the encrypted data file from the second computer, decrypt the data file, modify the decrypted data file, encrypt the modified data file, and transmit the modified data file to the second computer. In an alternate embodiment, the processor of the second computer is further configured to retrieve the modified data file from the one or more memory locations, and transmit the encrypted modified data file to the first computer. In an alternate embodiment, the first computer is further configured to receive the encrypted modified data file from the second computer, decrypt the modified data file in the memory subsystem, and display or provide access to the decrypted data file. Decrypting the encrypted data file occurs without assistance from a user and without requiring knowledge of the decryption algorithm by the user.

In an alternate embodiment, a system for transferring an electronic file comprises a receiving system for receiving an electronic date file, an encryption system for encrypting the electronic date file, a decryption system for decrypting the electronic data file, a memory system for storing the encrypted data file, and transmitting system for transmitting the decrypted data file, wherein the system is configured to encrypt and decrypt the electronic date file without assistance from the user or knowledge of the decryption algorithm used. In this embodiment, the systems may be deployed on one or more computers, servers or networks.

Further advantages and aspects of the present invention will become apparent to those of ordinary skill in the art upon reading and understanding the following detailed description of the invention.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention. In the drawings, common elements are identified by common reference numerals.

DETAILED DESCRIPTION OF THE INVENTION

Before the present methods and systems are described, it is to be understood that this invention is not limited to the particular methodologies, protocols, or systems described, as these may vary. It is also to be understood that the terminology used in the description is for the purpose of describing the particular versions or embodiments only, and is not intended to limit the scope of the present invention which will be limited only by the appended claims. In particular, although the present invention is described in conjunction with Internet files, it will be appreciated that the present invention may find use in any electronic exchange of data.

It must also be noted that as used herein and in the appended claims, the singular forms "a", "an", and "the" include plural reference unless the context clearly dictates otherwise. Thus, for example, reference to a "computer" or "server" is a reference to one or more computers or servers and equivalents thereof known to those skilled in the art, and so forth. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications mentioned herein are incorporated by reference. Nothing herein is to be construed as an admission that the invention is not entitled to antedate such disclosure by virtue of prior invention.

Figure 1:
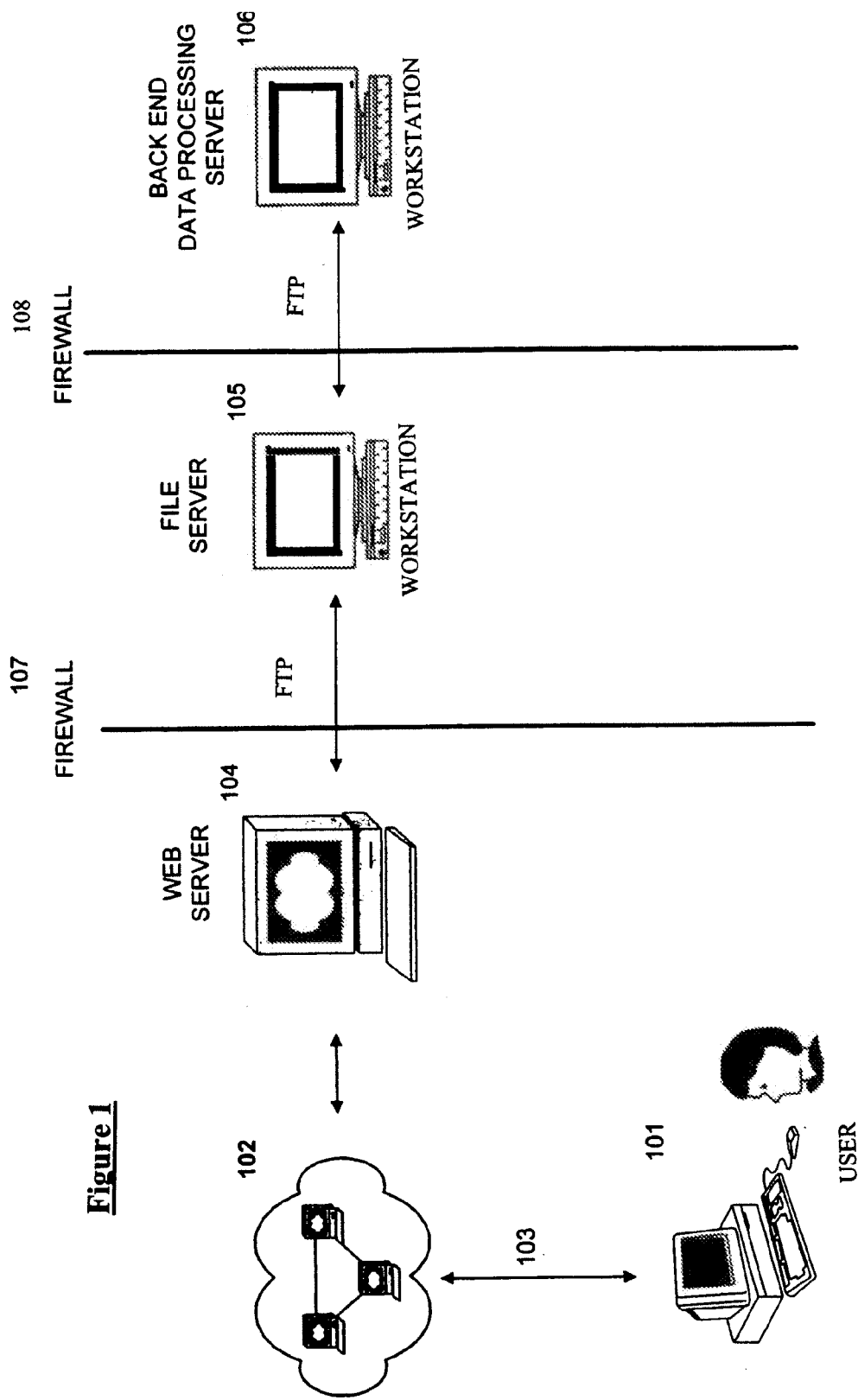
FIG. 1 depicts an exemplary diagram of the computer architecture and network connections used to implement an embodiment of the present invention.

FIG. 1 depicts an exemplary diagram of the computer architecture and network connections used to implement an embodiment of the present invention. A user computer 101 may be connected to a computer network 102. The computer network 102 may include, without limitation, the Internet, an intranet, or any other interconnected network of computers. The connection of the user computer 101 to the computer network 102 may be achieved by any communication means 103 including, but not limited to, a dialup service, a cable connection, a digital subscriber line, an Ethernet network interface, an Asynchronous Transfer Mode network interface, a wireless service, or similar technologies. The communication means may utilize any communication protocol, although a secure protocol such as HTTPS is preferred. A first server 104, which may run, for example, a standard HTTP/HTTPS web server application, may be used to transmit information that may be displayed on web pages to the user computer 101. A second server 105 may store a plurality of files which may be retrievable by a third server 106 or the first server 104. The third server 106 may be used to host special purpose applications that may transform or modify encrypted files and generate outgoing user-deliverable files. Optimally, the system may be configured with one or more firewalls, such as firewalls 107 and 108, to control the flow of data between components of the system. It should be apparent to one skilled in the art that the servers identified in FIG. 1 may be physical servers such as individual computers or logical servers.

Figure 3:
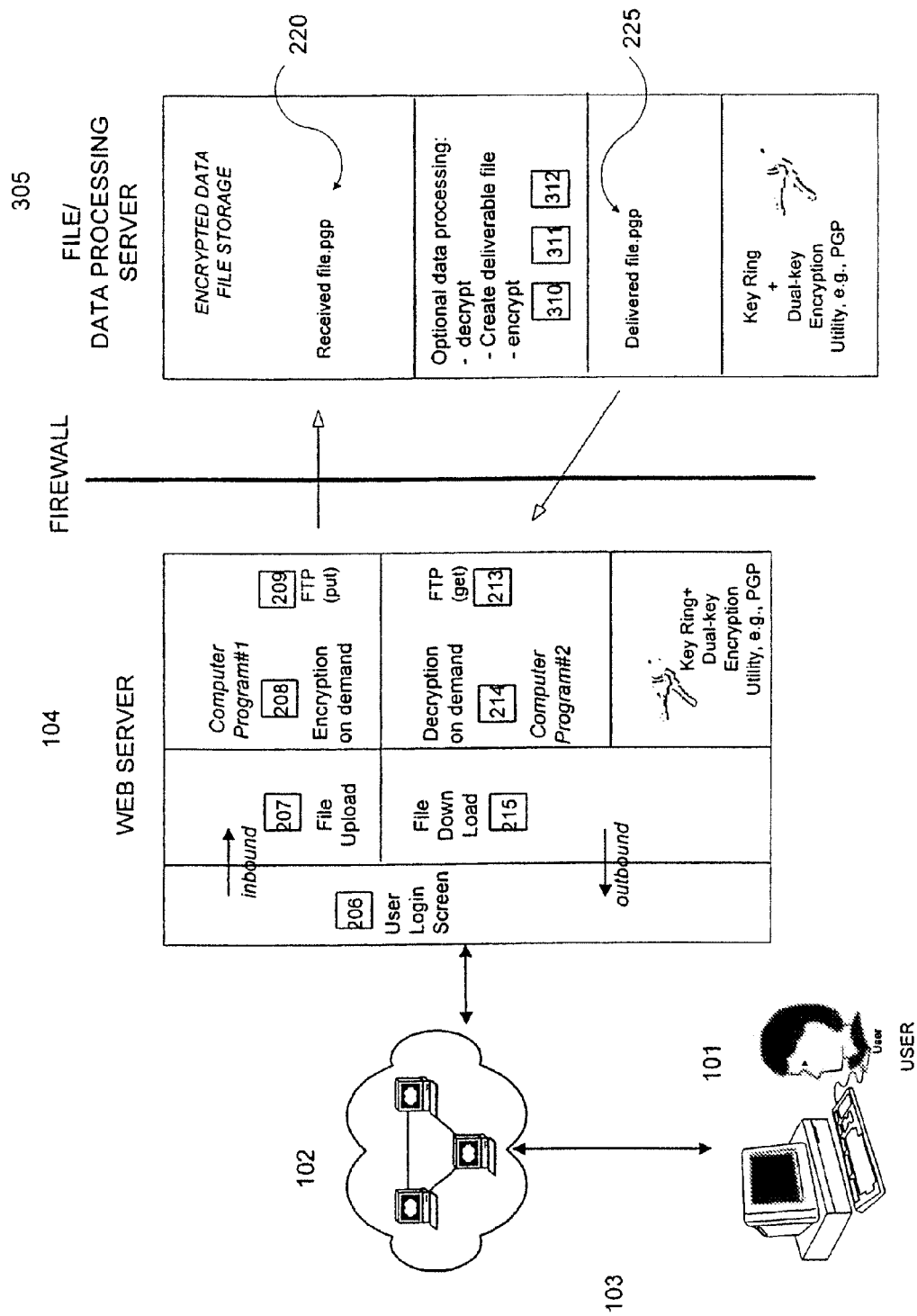
FIG. 3 illustrates a data flow diagram of the inbound flow of files sent from an external user and the outbound flow of files sent to an external user according to an embodiment of the present invention implemented on a two-tiered architecture.
Figure 4:
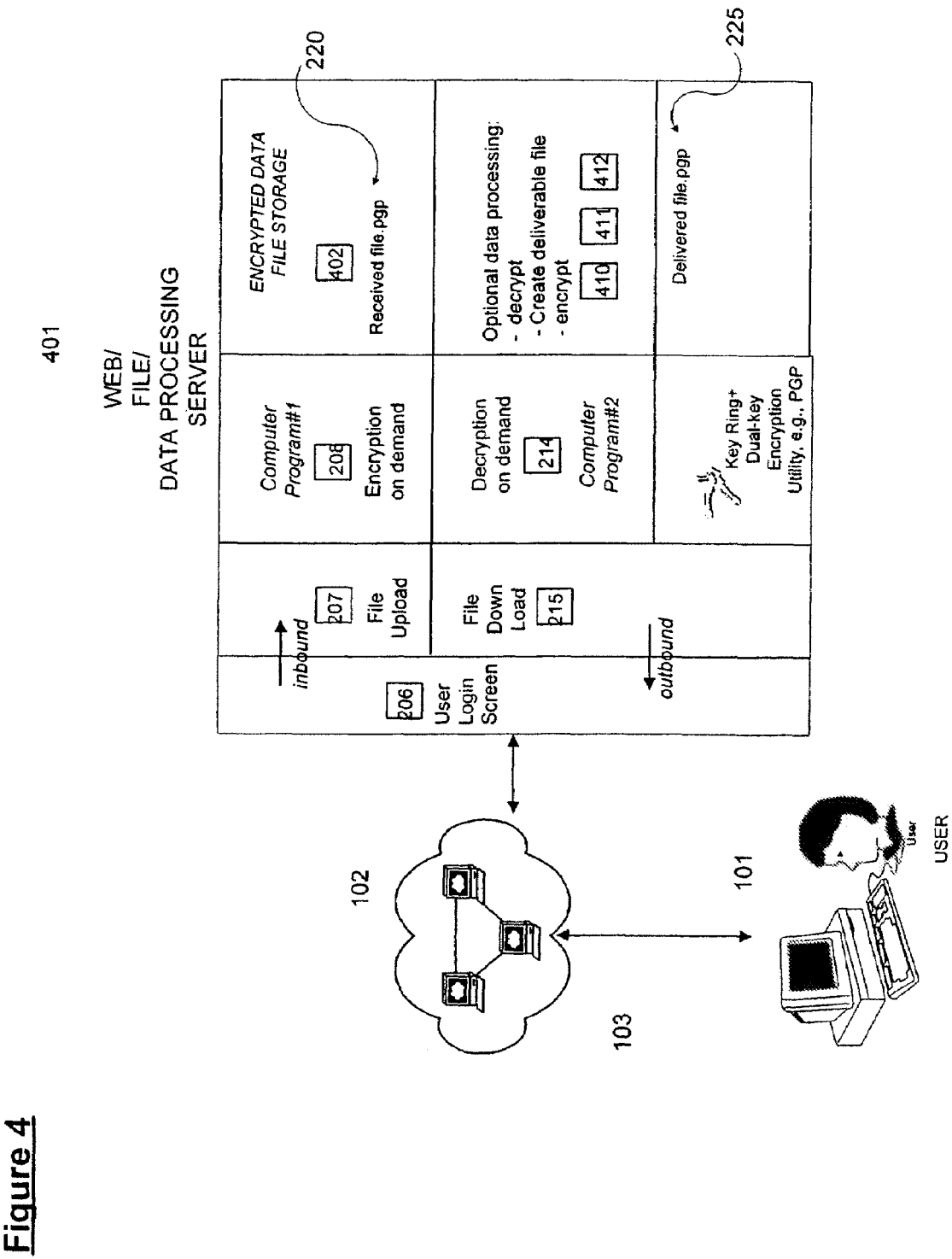
FIG. 4 illustrates a data flow diagram of the inbound flow of files sent from an external user and the outbound flow of files sent to an external user according to an embodiment of the present invention implemented on a single computer.

The computer/network architecture depicted in FIG. 1 is only one of many configurations that may be used to implement the method and system of the present invention. For example, the method or system may be implemented using only two computers, such as a first computer performing the functions of the first server 104 and a second computer performing the functions of the second server 105 and the third server 106. An example of such an embodiment is depicted in FIG. 3. Moreover, the method or system may be implemented entirely within a single computer that performs the functions of all three servers described in reference to FIG. 1. An example of such an embodiment is depicted in FIG. 4. However, the network architecture depicted in FIG. 1, and described in reference thereto, is preferred because it maximizes security by separating the data flow and processing across machines that may be separated by firewalls.

Figure 2:
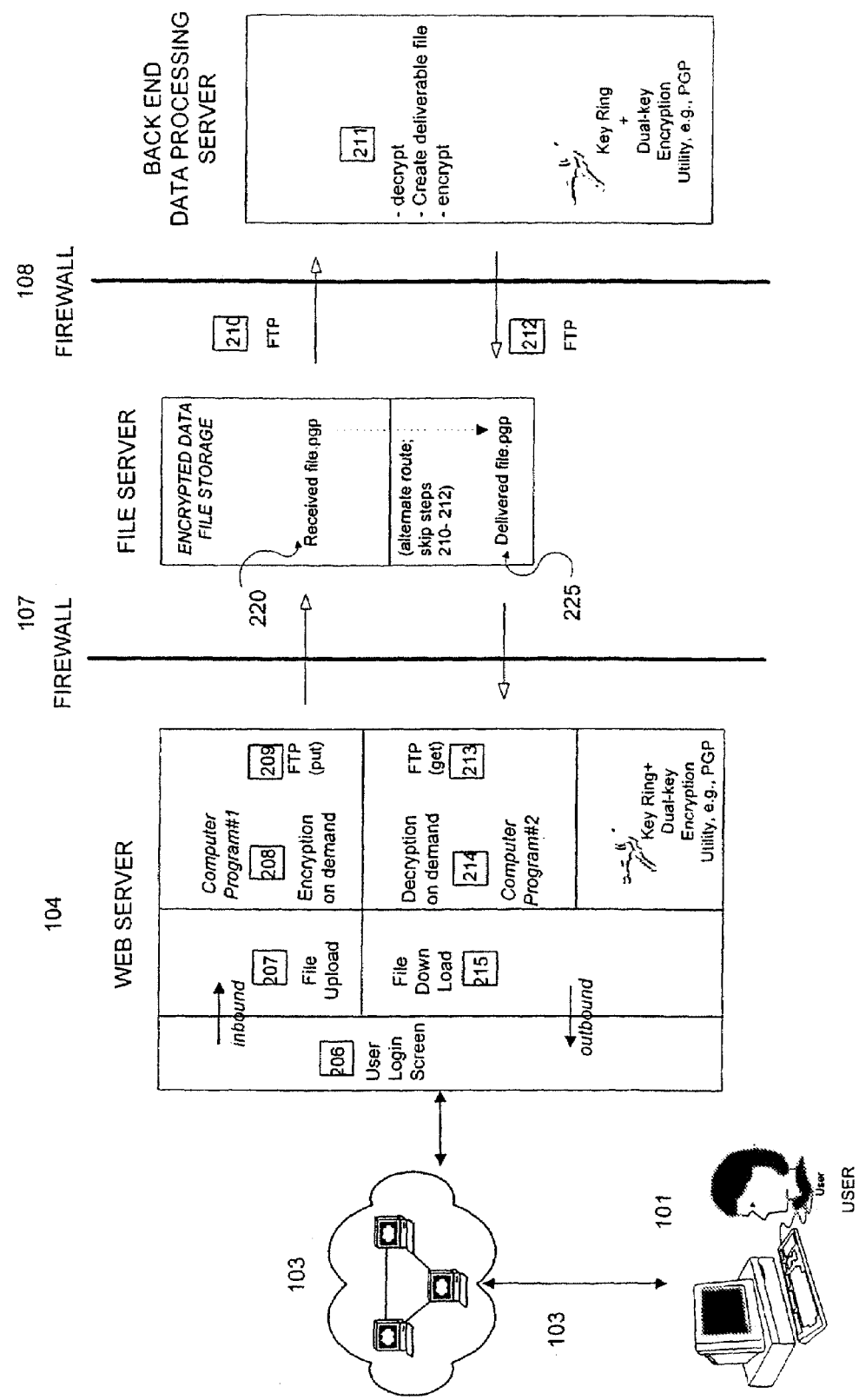
FIG. 2 illustrates a data flow diagram of the inbound flow of files sent from an external user and the outbound flow of files to an external user according to an embodiment of the present invention implemented on a three-tiered architecture.

FIG. 2 illustrates a data flow diagram of the inbound flow of files sent from a user computer 101 and the outbound flow of files to a user computer 101 according to an embodiment of the present invention. The user computer 101 may access a first server 104 via communication means 103 to a network 102 connected to the first server 104. The user computer 101 may access the first server 104 by way of a login page 206 of a service provider's website using any web browsing application, such as Netscape Navigator or Microsoft's Internet Explorer. For example a user may supply an assigned username and password when accessing the login page 206 in order to access the first server 104. The transmission of the login page 206 and all subsequently described pages and files transmitted between the user computer 101 and the first server 104 will utilize a secure protocol such as SSL/HTTPS. The login page 206 of the preferred embodiment may be used to provide an additional layer of security. However, the login page 206 may be removed where user authentication via the submission of a username and/or a password is unnecessary, but encryption/decryption-on-demand is still required.

A user may select a file stored locally on the user computer 101 and submit the file for processing by the first server 104 via a file upload web page 207. The file upload process may be achieved through use of a standard techniques including use of a mark language tag, such as an HTML tag. The upload transmission may be securely transmitted via use of a secure protocol, such as SSL/HTTPS, which provides an additional layer of security to the transmission environment. In an alternate embodiment, the SSL/HTTPS standard is not used for the transmission of one or more of the transmitted files between the user computer 101 and the first server 104.

Figure 5:
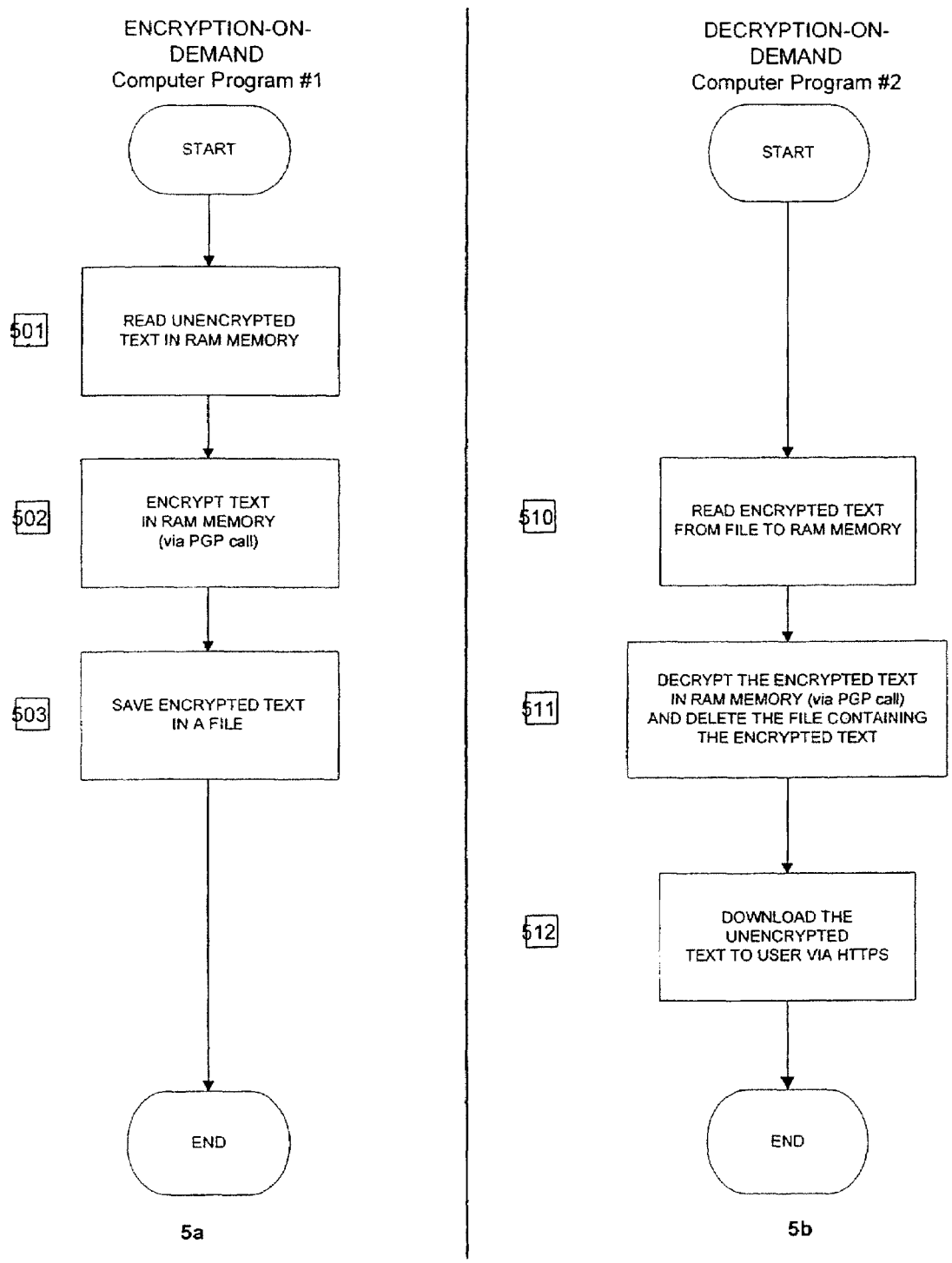
FIG. 5 shows a program logic diagram for two computer program applications according to an embodiment of the present invention.

A computer program 208 written in a computer-recognizable language, such as Perl, and stored on the first server 104, may be used to process an incoming electronic data file. The process of encrypting the program is depicted in FIG. 5*a*. The electronic data file may be processed by placing the data file in unencrypted form 501 into a memory subsystem of the first server 104. The memory subsystem may include one or more memory devices, including without limitation, Random Access Memory (RAM), Dynamic Random Access Memory (DRAM), RDRAM, SDRAM, a CPU embedded cache, or any equivalents thereof. The content of the data file may then be encrypted 502 in the memory subsystem via a system call to an encryption application, such as PGP. The encrypted data content is then saved 503 to a file on the first server 104. Returning to FIG. 2, the encrypted data file may then be transferred 209 from the first server 104 to the second server 105. This transfer may be performed via a File Transfer Protocol (FTP) program or any similar program for transferring files between servers.

Once the encrypted data file is stored on the second server 105, additional processing of the encrypted data file on the third server 106 may be performed. Such additional processing is optional to the present invention. The additional processing may include transmitting 210 the encrypted data file as the input file 220 for the additional processing from the second server 105 to the third server 106. The encrypted data file is then decrypted on the third server 106. The decrypted data file may then be accessed, analyzed, modified and/or rewritten 211 by the third server 106. When processing on the third server 106 is completed, the data file is then encrypted, and transmitted 212 as the output file of the additional processing 225 to the second server 105 as an encrypted user-deliverable data file.

When requested by a user, the encrypted, data file may be transmitted 213 from the second server 105 to the first server 104. This may be accomplished by using a FTP program. A computer program 214 written in a computer-recognizable language, such as Perl, and stored on the first server 104, may be used to decrypt the outgoing encrypted user-deliverable data file. The process of decrypting the file is depicted in FIG. 5*a*. The encrypted user-deliverable data file may be read, in encrypted form 510 into the memory subsystem. The file content may be decrypted in the memory subsystem via a system call to a decryption application, such as PGP, and the encrypted data file deleted from the system 511. The decrypted content in the memory subsystem is then available to be downloaded to the user via a secure protocol such as HTTPS 512. Returning to FIG. 2, once the data file has been decrypted it is then available to be downloaded via a file download page 215.

In an alternate embodiment, the system of the present invention may be implemented on a two-server architecture. As shown in FIG. 3, the user computer 101 connects to a first server 104 via a network 102. Access to the first server 104 is provided via the user log-in page 206. The user may then submit a data file via the file upload page 207. The computer program 208 encrypts the data file and the encrypted data file is transmitted 209, such as via an FTP command, to a second server 305. The encrypted data file is received by the second server 305 and stored in one or more memory location on the second server 305. Optional data processing may then be performed where such processing occurs via the second server 305. If such optional processing is performed, the encrypted data file is decrypted 310, the optional processing is performed 311 ad the data file is then encrypted 312 again. When the user then requests access to the data file, the data file is retrieved 213 from the second server 305, such as via an FTP command. The computer program 214 decrypts the data file which is then available to be downloaded via a file download page 215. The decrypted file is then transmitted to the user computer 101, via the network 102 utilizing a secure protocol such as HTTPS.

Although the computer programs 208 and 214 have been described in embodiments in which the program has been implemented in the Perl programming language, any programming language or application environment permitting direct system calls (e.g., to an encryption utility) and Common Gateway Interface (CGI) interactions with a computer may be used. Moreover, although the present invention has been described with the use of PGP encryption, other encryption technologies will be equally effective including dual-key encryption, single-key encryption, hardware key encryption, or other encryption methodologies.

Furthermore, the computer programs 208 and 214 may perform additional functions that are not essential to the implementation of the present invention. The additional, non-essential functions are part of the preferred embodiment of the present invention, however, and are referenced herein to show the implementation of the preferred embodiment. The additional, non-essential functions may include, without limitation, a user authentication process including the reception of a username and password; means for creating a web page (dynamically) listing all available user-deliverable files and allowing the user to choose which file to decrypt and download; data compression; or other applications to efficiently or effectively receive, store, transmit or otherwise manage electronic data files.

In an alternate embodiment, the present invention may be implemented on a single server. As shown in FIG. 4, a user may access the system via a user computer 101 connected to a server computer 401 via a network 102. The user may access the server computer 401 via a user login screen 206 and upload to the sewer computer 401 a data file via a file upload page 207. The data file will be encrypted by a computer program 208 and stored in one or more memory locations 402 on the server computer 401. Optionally, additional processing may be performed on the data file while the file resides on the server computer 401 by decrypting the data file 403, performing such optional processing 404, and encrypting the data file 405 again. When the user requests access to the data file, the computer program 214 decrypts the data file and the data file is available to be downloaded via a file download page 215. The decrypted file is then transmitted to the user computer 101 via the network 102 utilizing a secure protocol such as HTTPS.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for securely storing an electronic data file comprising:
   transmitting an electronic data file from a user device to a first computer system, wherein the first computer system comprises a memory subsystem;
   encrypting the data file in the memory subsystem;
   transmitting the encrypted data file to a second computer system having a plurality of memory locations;
   retrieving the encrypted data file from the one or more memory locations;
   transmitting the encrypted data file to a third computer system;
   decrypting the encrypted data file on the third computer system;
   modifying the decrypted data file on the third computer system;
   re-encrypting the modified, decrypted data file on the third computer system;
   transmitting the re-encrypted data file to the second computer system; and
   storing the re-encrypted data file in one or more of the memory locations,
   wherein encrypting and re-encrypting the data file occur without assistance from a user and without requiring the user's knowledge of an algorithm used to encrypt the data file.

2. The method of claim 1 further comprising:
   retrieving the re-encrypted data file from the one or more memory locations;
   decrypting the data file; and
   providing the user access to the data file, wherein the decrypting occurs without assistance from the user and without requiring the user's knowledge of the algorithm used to encrypt the data file.

3. A system for transferring an electronic data file, comprising:
   a first computer system for encrypting a data file and decrypting an encrypted data file, the first computer system having a memory subsystem;
   a second computer system in communication with the first computer system, the second computer system having a plurality of memory locations configured to store the encrypted data files; and
   a third computer system in communication with the second computer system,
   wherein the first computer system is configured to:
     receive the data file from a user device;
     encrypt the data file in the memory subsystem without interaction from a user and without requiring the user's knowledge of an algorithm used to encrypt the data file; and
     transmit the encrypted data file to the second computer system,
   wherein the second computer system is configured to:
     receive the encrypted data file from the first computer system;
     store the encrypted data file in one or more memory locations;
     retrieve the encrypted data file from the one or more memory locations;
     transmit the encrypted data file to the third computer system;
     receive a re-encrypted data file from the third computer system; and
     store the re-encrypted data file in the one or more memory locations, and
   wherein the third computer system is configured to:
     receive the encrypted data file from the second computer;
     decrypt the encrypted data file;
     modify the decrypted data file;
     re-encrypt the modified, decrypted data file; and
     transmit the re-encrypted data file to the second computer.

4. The system of claim 3 wherein the second computer system is further configured to:
   retrieve the re-encrypted data file from the one or more memory locations; and
   transmit the re-encrypted data file to the first computer.

5. The system of claim 3 wherein the first computer system is further configured to:
   receive the re-encrypted data file from the second computer;
   decrypt the re-encrypted data file in the memory subsystem; and
   display the decrypted data file,
   wherein decrypting the re-encrypted data file occurs without interaction with a user and without requiring the user's knowledge of the algorithm used to decrypt the re-encrypted data file by the user.

6. A method for securely accessing an electronic data file comprising:
retrieving, from a first computer system comprising a plurality of memory locations, an encrypted data file from one or more of the memory locations;
transmitting the encrypted data file to a second computer system comprising a memory subsystem;
transmitting the encrypted data file to a third computer system;
decrypting the encrypted data file on the third computer system;
modifying the data file on the third computer system;
re-encrypting the modified data file on the third computer system;
transmitting the re-encrypted data file to the first computer system;
storing the re-encrypted data file in the one or more memory locations;
decrypting the re-encrypted data file in the memory subsystem; and
displaying the decrypted data file,
wherein decrypting the encrypted data file occurs without assistance from a user and without requiring the user's knowledge of an algorithm used to encrypt the data file.

7. A system for securely storing electronic data files comprising:
means for receiving a data file from a user device on a first computer;
means for encrypting the data file;
means for storing the encrypted data file on a second computer;
means for retrieving the stored data file;
means for decrypting and modifying the retrieved data file on a third computer;
means for re-encrypting the modified data file on the third computer;
means for storing the re-encrypted modified data file;
means for decrypting the re-encrypted data file; and
means for displaying the decrypted data file.

* * * * *